(12) United States Patent
Kikuchi et al.

(10) Patent No.: US 7,095,132 B2
(45) Date of Patent: Aug. 22, 2006

(54) WIND TURBINE GENERATOR SYSTEM

(75) Inventors: Akira Kikuchi, Hitachi (JP); Motoo Futami, Hitachiota (JP); Yasuhiro Imazu, Hitachi (JP); Yoshio Eguchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 10/894,050

(22) Filed: Jul. 20, 2004

(65) Prior Publication Data

US 2005/0017512 A1    Jan. 27, 2005

(30) Foreign Application Priority Data

Jul. 22, 2003    (JP)    ............... 2003-199571

(51) Int. Cl.
| | |
|---|---|
| F01D 15/10 | (2006.01) |
| H02H 7/06 | (2006.01) |
| H02P 9/00 | (2006.01) |
| H02P 11/00 | (2006.01) |

(52) U.S. Cl. .................. 290/52; 290/44; 322/29
(58) Field of Classification Search ............ 290/44, 290/52; 322/29
See application file for complete search history.

(56) References Cited

U.S. PATENT DOCUMENTS

| | | | | |
|---|---|---|---|---|
| 4,344,025 A | * | 8/1982 | Okuyama et al. | 318/729 |
| 4,357,569 A | * | 11/1982 | Iwakane et al. | 318/721 |
| 4,358,722 A | * | 11/1982 | Iwakane et al. | 318/661 |
| 4,358,726 A | * | 11/1982 | Iwakane et al. | 318/798 |
| 4,625,125 A | * | 11/1986 | Kuwabara | 290/52 |
| 4,694,189 A | * | 9/1987 | Haraguchi et al. | 290/40 C |
| 4,743,827 A | * | 5/1988 | Shiozaki et al. | 318/798 |
| 4,754,156 A | * | 6/1988 | Shiozaki et al. | 290/52 |
| 4,816,696 A | * | 3/1989 | Sakayori et al. | 290/52 |
| 4,823,018 A | * | 4/1989 | Kuwabara et al. | 290/7 |
| 4,856,965 A | * | 8/1989 | Katsuie et al. | 417/19 |
| 4,870,339 A | * | 9/1989 | Furukawa et al. | 322/29 |
| 5,029,288 A | * | 7/1991 | Kubota et al. | 322/29 |
| 5,886,417 A | * | 3/1999 | Oka et al. | 290/52 |
| 6,043,632 A | * | 3/2000 | Maehara et al. | 322/28 |
| 6,737,835 B1 | * | 5/2004 | Taniguchi | 322/29 |

FOREIGN PATENT DOCUMENTS

| | | | |
|---|---|---|---|
| JP | 2001238493 A | * | 8/2001 |
| JP | 2003-120504 | | 4/2003 |

* cited by examiner

*Primary Examiner*—Darren Schuberg
*Assistant Examiner*—Pedro J. Cuevas
(74) *Attorney, Agent, or Firm*—Antonelli, Terry, Stout and Kraus, LLP.

(57) ABSTRACT

An object of the present invention is to minimize the torsional vibration caused on the shafting of the wind turbine genarator system so as to operate the windmill stably.

A wind turbine genarator system according to the present invention, equipped with a synchronous generator connected to the shaft of a windmill, converter connected to the stator of the synchronous generator, and inverter connected to the converter and also to an electric power system, extracts the torsional vibration component of the shafting between the windmill and synchronous generator from the detected rotation speed of the synchronous generator, regulates the active component of the current command to the converter according to the vibration component, and controls so as to minimize the rotation speed variation of the synchronous generator.

5 Claims, 2 Drawing Sheets

WIND TURBINE GENERATOR SYSTEM

CLAIM OF PRIORITY

The present application claims priority from Japanese application serial no. 2003-199571, filed on Jul. 22, 2003, the content of which is hereby incorporated by reference into this application.

Field of the Invention

The present invention relates to a wind turbine genarator system that controls the torsional vibration caused on the shafting between the windmill and synchronous generator.

BACKGROUND OF THE INVENTION

A conventional wind turbine generator system according to a prior art has been as follows. A windmill is connected to a synchronous generator and power is generated as the windmill is rotated by wind energy and so the synchronous generator is driven by the windmill. The alternating current power generated by the synchronous generator is converted into direct current power by a converter and further converted into the commercial-frequency alternating current power by an inverter, and then supplied to an electric power system. A wind turbine genarator system having the above construction has been disclosed, for example, in the Patent Document 1.

[Patent Document 1]
Japanese Patent Application Laid-Open Publication No. 2003-120504.

SUMMARY OF THE INVENTION

If torsional vibration is caused on the shafting between the windmill and synchronous generator, however, it is impossible to continue the operation in the prior art. If torsional vibration is caused on the shafting, it is necessary to stop the windmill and cease power generation to prevent the shaft from being damaged.

An object of the present invention is to provide a wind turbine generator system that minimizes the torsional vibration caused on the shafting of the wind turbine genarator system so as to operate the windmill and generate power stably.

A wind turbine genarator system according to the present invention, equipped with a synchronous generator connected to the shaft of a windmill, a converter connected to the stator of a synchronous generator, and an inverter connected to the converter and also to an electric power system, extracts the torsional vibration component of the shafting between the windmill and the synchronous generator from the detected rotation speed of the synchronous generator, regulates the active component of the current command to the converter according to the vibration component, and controls so as to minimize the rotation speed variation of the synchronous generator.

DESCRIPTION OF THE PREFERRED EMBODIMENTS

Figure 1:
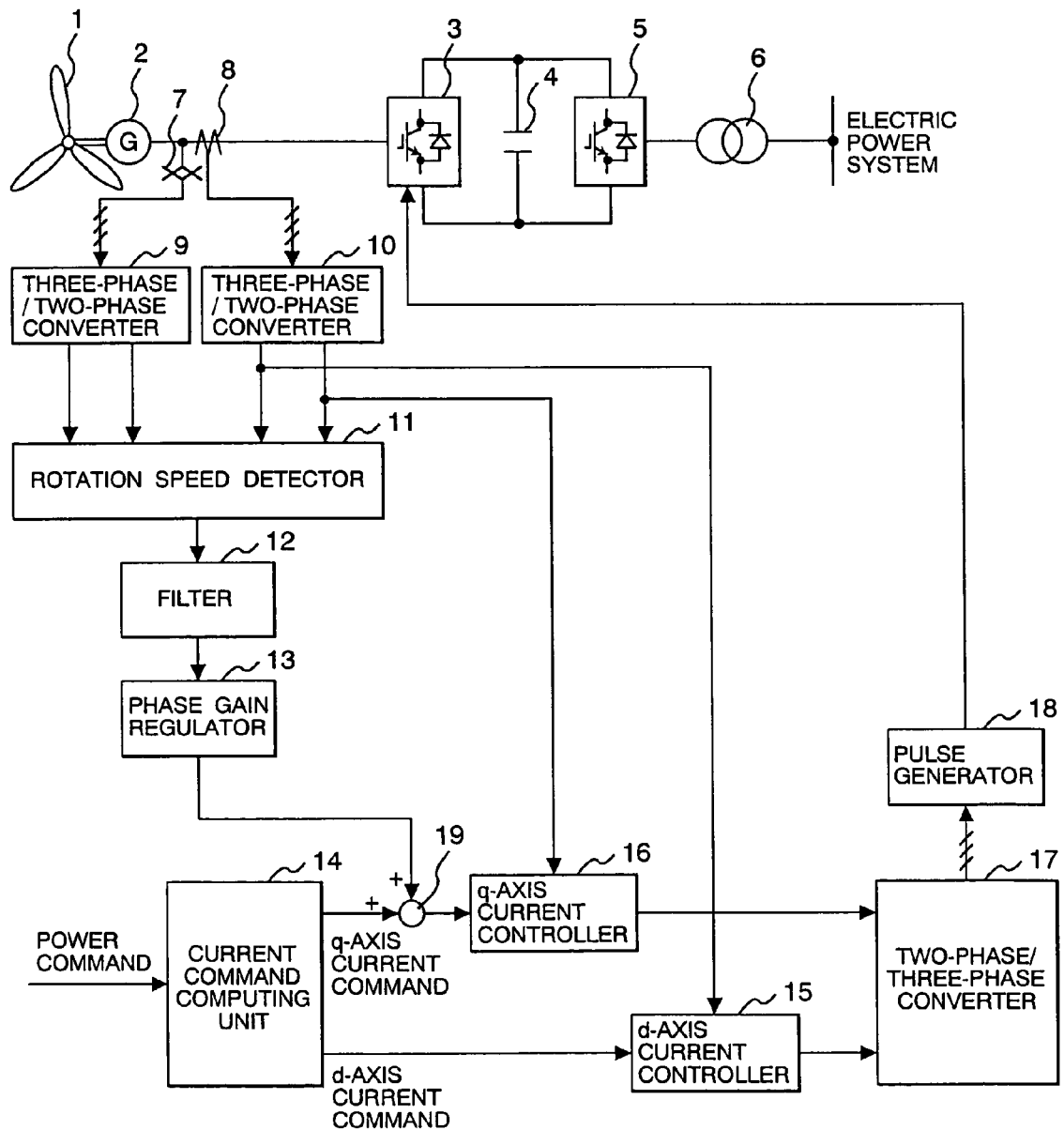
FIG. 1 shows an overall construction of the wind turbine generator system of an embodiment of the invention.

An embodiment of the present invention is described hereunder, using figures. FIG. 1 shows an overall construction of an embodiment of the invention. In FIG. 1, the rotor of a synchronous generator 2 is connected to the shaft of a windmill 1 and, when the windmill 1 is rotated by wind energy, the synchronous generator 2 generates variable-frequency alternating current power in accordance with the rotation speed of the windmill 1. A converter 3 is connected to the shaft of the synchronous generator 2 and the variable-frequency alternating current power generated by the synchronous generator 2 is converted into direct current power by the converter 3. The direct current side of the converter 3 is connected to the direct current side of an inverter 5 via a direct current capacitor 4. The inverter 5 converts the direct current power sent from the converter 3 into fixed-frequency alternating current power. The alternating current side of the inverter 5, connected to an electric power system via a transformer 6 for system interconnection, supplies the fixed-frequency alternating current power to the electric power system.

A voltage sensor 7 and current sensor 8 are installed between the synchronous generator 2 and converter 3. The voltage sensor 7 detects the terminal voltage of the synchronous generator 2 and the current sensor 8 detects the current through the stator of the synchronous generator 2. The voltage detected by the voltage sensor 7 is converted into d-axis component and q-axis component by the three-phase/two-phase converter 9. The amperage detected by the current detector 8 is converted into d-axis component and q-axis component by the three-phase/two-phase converter 10. In this embodiment, the d-axis component represents reactive component and the q-axis component represents active component.

A rotation speed detector 11 detects the rotation speed of the synchronous generator 2 based on the d-axis component signal and q-axis component signal outputted from the three-phase/two-phase converters 9 and 10. A filter 12 receives the rotation speed signal of the synchronous generator 2 outputted from the rotation speed detector 11 and extracts a specified frequency component out of the input signal. The frequency component extracted by the filter 12 shall be set to the torsional vibration frequency of the shafting between the windmill 1 and synchronous generator 2. A phase gain regulator 13 regulates and outputs the phase and gain of the signal outputted from the filter 12. The filter 12 and phase gain regulator 13 constitute a vibration eliminating portion.

A current command computing unit 14 receives an electric power command to the converter 3 and outputs the d-axis component and q-axis component of the current command to the converter 3. The signal outputted from the phase gain regulator 13 is added to the q-axis component of the current command outputted from the current command computing unit 14 by an adder 19.

A d-axis current controller 15 receives the d-axis component of the detected amperage outputted from the three-phase/two-phase converter 10 and d-axis component of the current command to the converter 3. The d-axis current regulator 15 outputs the d-axis component of the output voltage command to the converter 3. The d-axis current controller 15, consisting for example of a proportional-plus-integral control system, determines the output voltage command to the converter 3 so that the deviation between the detected amperage and current command becomes zero.

A q-axis current controller 16 receives the q-axis component of the detected amperage outputted from the three-phase/two-phase converter 10 and q-axis component of the current command to the converter 3, and outputs the q-axis component of the output voltage command to the converter 3. The q-axis current controller 16, consisting, for example, of a proportional-plus-integral control system, determines the output voltage command to the converter 3 so that the deviation between the detected amperage and current command becomes zero.

The d-axis component and q-axis component of the output voltage command outputted from the d-axis current regulator 15 and q-axis current regulator 16 respectively are converted into three-phase output voltage command by a two-phase/three-phase converter 17.

A pulse generator 18 operates PWM (pulse width modulation) based on the three-phase output voltage command outputted from the two-phase/three-phase converter 17 and outputs a gate pulse signal to the converter 3. The converter 3, having received the gate pulse signal, switches the power semiconductor switching device such as IGBT and power MOSFET at high speed and outputs a voltage corresponding to the output voltage command.

Figure 2:
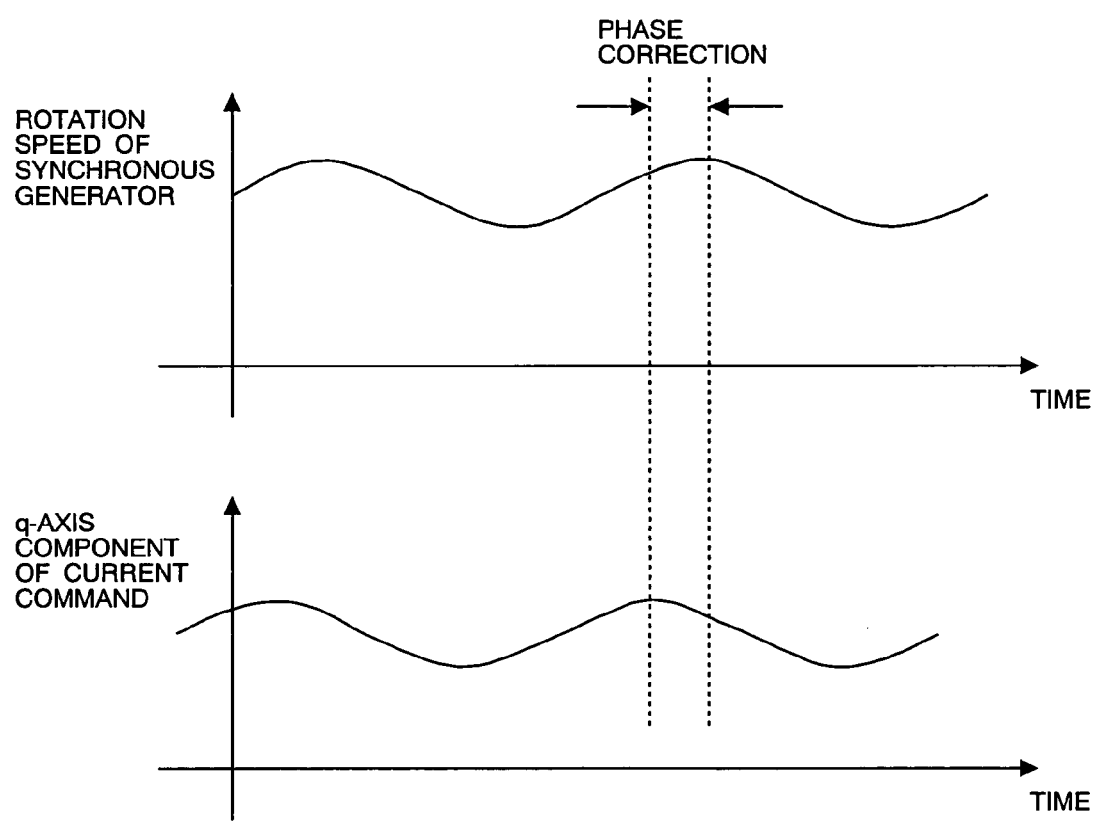
FIG. 2 shows the relationship between the rotation speed of the synchronous generator and q-axis component of the current command to the converter in case torsional vibration is caused.

Next, the operation in case that torsional vibration is caused on the shafting between the windmill 1 and synchronous generator 2 is described hereunder. FIG. 2 shows the relationship between the rotation speed of the synchronous generator 2 and q-axis component of the current command to the converter 3 in case torsional vibration is caused.

In this embodiment, if the rotation speed of the synchronous generator 2 increases due to the occurrence of torsional vibration, the q-axis component of the current command to the converter 3 is increased via the rotation speed detector 11, filter 12 and phase gain regulator 13 shown in FIG. 1. By increasing the q-axis component of the current command as above, the output of the synchronous generator 2 is increased.

Accordingly, the output of the synchronous generator 2 becomes greater than the mechanical input power given by the windmill 1 to the synchronous generator 2, and so the input power becomes insufficient. However, because this insufficiency is made up from the rotation energy of the rotor of the synchronous generator 2, the rotation speed of the synchronous generator 2 is decreased.

On the contrary, if the rotation speed of the synchronous generator 2 decreases, the q-axis component of the current command to the converter 3 is decreased via the rotation speed detector 11, filter 12 and phase gain regulator 13. By decreasing the q-axis component of the current command, the output of the synchronous generator 2 is decreased.

Accordingly, the output of the synchronous generator 2 becomes smaller than the mechanical input power given by the windmill 1 to the synchronous generator 2, and so the input power becomes excessive. However, because this excessive input power is stored as the rotation energy of the rotor of the synchronous generator 2, the rotation speed of the synchronous generator 3 is increased.

In this embodiment, as described above, the rotation speed variation of the synchronous generator 2 can be controlled by regulating the q-axis component of the current command to the converter 3 in accordance with the rotation speed variation of the synchronous generator 2. If any vibration of the shafting between the windmill 1 and synchronous generator 2 is caused by a frequency component not related to torsional vibration, no control over the vibration applies because it is out of the frequency range extracted by the filter 12. In other words, control over vibration applies only in case that a vibration of a specified frequency set in the filter 12 is caused, and accordingly normal operation is in no way interrupted by any other vibration.

In this construction, the filter 12 can be of any type, such as a band-pass filter that allows signals in a specified frequency band including the frequency component of the vibration to pass, low-pass filter that allows signals equal to or lower than a specified frequency including the frequency component of the vibration to pass, or high-pass filter that allows signals equal to or higher than a specified frequency including the frequency component of the vibration, provided that it can extract the frequency component of the torsional vibration on the shafting between the windmill 1 and synchronous generator 2. The filter 12 can be either one consisted of analog circuitry or one consisted of digital signal processing circuitry.

Although the rotation speed of the synchronous generator 2 is detected based on the voltage and amperage of the synchronous generator 2 in this embodiment, it is naturally permissible that the rotation speed is detected by a mechanical rotation speed detector and the speed signal is passed through the filter 12.

According to the present invention, the torsional vibration caused on the shafting between the windmill and synchronous generator can be minimized and so the windmill can be operated stably and power be generated continuously.

What is claimed is:

1. A wind turbine generator system equipped with a synchronous generator connected to the shaft of a windmill, a converter connected to the stator winding of the synchronous generator, and an inverter connected to the converter and also to an electric power system, in which the variable-frequency power generated by the synchronous generator is converted into direct current power by the converter and then the direct-current power is converted into fixed-frequency alternating current power by the inverter comprising:
    a rotation speed detector that detects the rotation speed of the synchronous generator;
    a current detector that detects the current through the stator of the synchronous generator;
    a current controller that controls the amperage detected by the current detector and outputs a voltage command;
    a filter that receives the rotation speed detected by the rotation speed detector and then extracts and outputs a specified frequency component;
    a phase gain regulator that receives the output signal of the filter and then regulates and outputs phase and gain; and
    an adder that adds the signal outputted from the phase gain regulator to the current command sent to the current controller.

2. A wind turbine generator system according to claim 1, wherein the filter extracts the torsional vibration component caused on the shafting between the windmill and synchronous generator.

3. A wind turbine generator system equipped with a synchronous generator connected to the shaft of a windmill, a converter connected to the stator winding of the synchronous generator, and an inverter connected to the converter and also to an electric power system, in which the variable-frequency power generated by the synchronous generator is converted into direct current power by the converter and then the direct-current power is converted into fixed-frequency alternating current power by the inverter comprising:
    a rotation speed detector that detects the rotation speed of the synchronous generator;

a current detector that detects the current through the stator of the synchronous generator;

a computing unit that converts the three-phase amperage detected by the current detector into active component and reactive component;

a current controller that controls the active component and reactive component and outputs a voltage command;

a filter that receives the rotation speed detected by the rotation speed detector and then extracts and outputs a specified frequency component;

a phase gain regulator that receives the output signal of the filter and then regulates and outputs phase and gain; and an adder that adds the signal outputted from the phase gain regulator to the active component of the current command sent to the current controller.

4. A wind turbine generator system according to claim 3, wherein the filter extracts the torsional vibration component caused on the shafting between the windmill and synchronous generator.

5. A wind turbine generator system equipped with a synchronous generator connected to the shaft of a windmill, a converter connected to the stator winding of the synchronous generator, an inverter connected to the direct current side of the converter and also to an electric power system, and control unit of the converter; wherein the control unit of the converter extracts the torsional vibration component of the shafting between the windmill and synchronous generator from the detected rotation speed of the synchronous generator, regulates the active component of the current command to the converter according to the vibration component, and controls so as to minimize the rotation speed variation of the synchronous generator.

* * * * *